United States Patent

[11] 3,587,829

[72] Inventor Robert P. Sorensen
 Rockford, Ill.
[21] Appl. No. 813,618
[22] Filed Apr. 4, 1969
[45] Patented June 28, 1971
[73] Assignee Anderson Bros. Mfg. Co.
 Rockford, Ill.
 Continuation-in-part of application Ser. No. 554,284, May 24, 1966, now Patent No. 3,436,894, dated Apr. 8, 1969.

[54] CONVEYOR WITH INTERCHANGEABLE RECEIVERS
7 Claims, 9 Drawing Figs.
[52] U.S. Cl. .................................................. 198/131
[51] Int. Cl. .................................................. B65g 17/06

[50] Field of Search ........................................ 198/19, 131, 129; 53/37, (Inquired); 18/4 (C), (Inquired); 107/8.2, 8.5, (Inquired)

[56] References Cited
UNITED STATES PATENTS
3,082,709 3/1963 Jacobsen .................... 107/8(.2)
3,436,894 4/1969 Sorensen .................... 53/37

*Primary Examiner*—Edward A. Sroka
*Attorney*—McCanna, Morsbach, Pillote and Muir ABSTRACT: A conveyor advances a number of containers past a filler, sealing head, and cutter. The conveyor has a plurality of pivotally interconnected frames which support removably mounted receivers. Each frame has a plurality of equally spaced pins adjacent the top and the filler, sealing head, and cutter have teeth which mesh with the pins to drive them correlative to the movement of the conveyor.

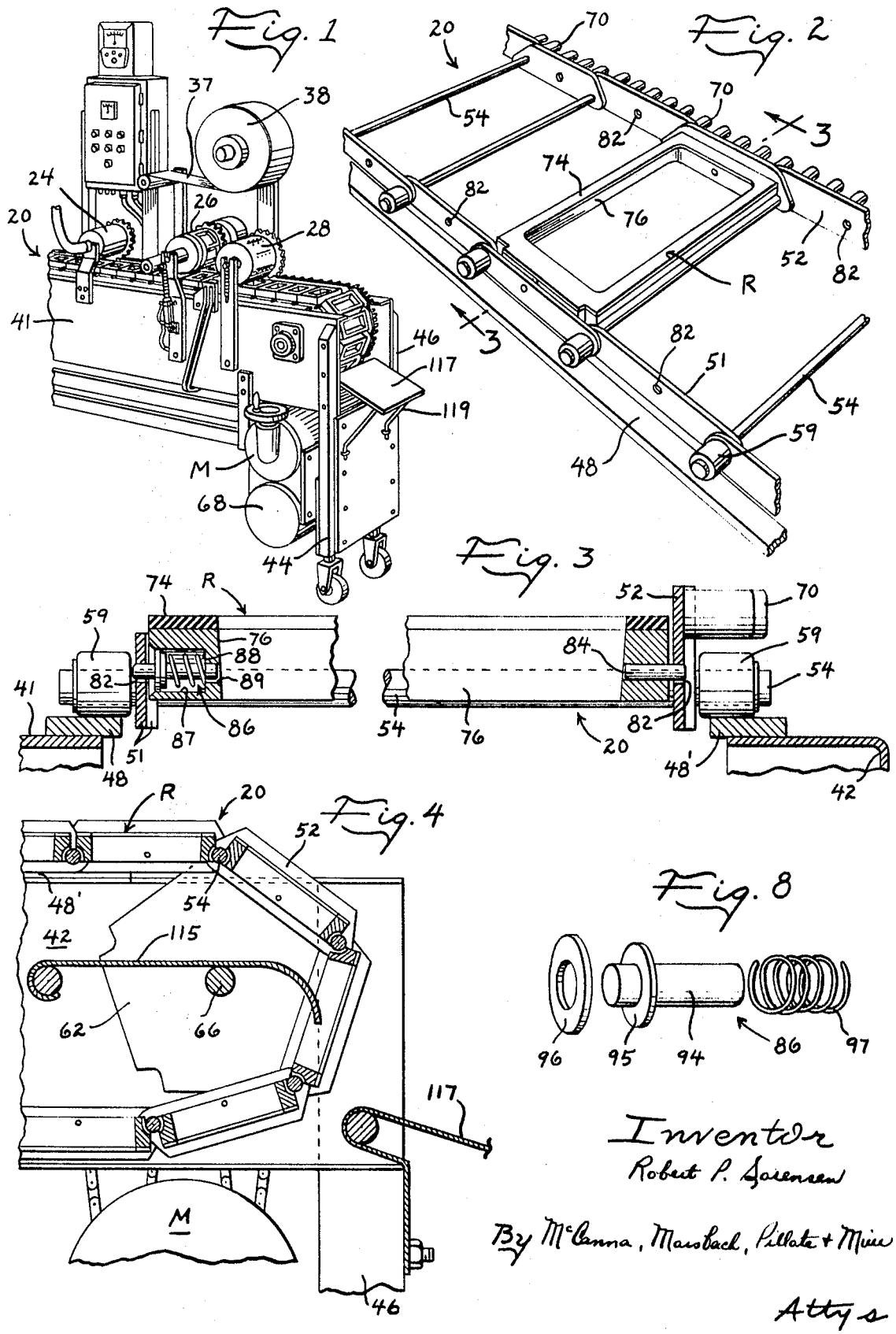

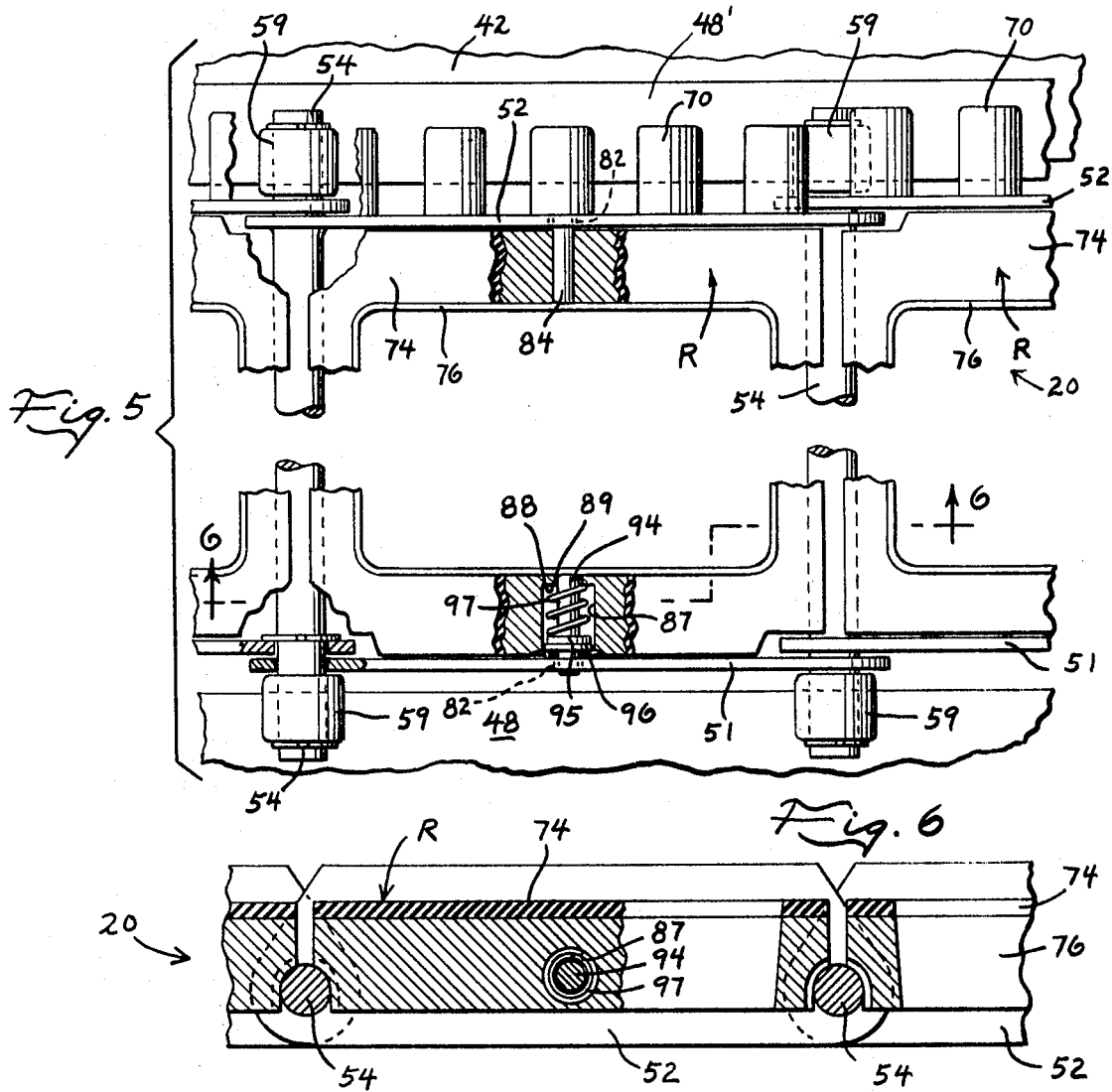

CONVEYOR WITH INTERCHANGEABLE RECEIVERS

CROSS-REFERENCE

This application is a continuation-in-part of U.S. Pat. application Ser. No. 554,284 filed May 24, 1966, now U.S. Pat. No. 3,436,894, issued Apr. 8, 1969.

BACKGROUND

The invention pertains generally to power driven conveyors, and especially to the structure of an endless conveyor.

In part, the above-mentioned parent patent application describes and claims apparatus for solving the problem of coordinating various packaging operations with the movement of the conveyor in a simplified and reliable manner. This was accomplished by providing a plurality of pivotally interconnected pockets and each pocket having a plurality of equally spaced pins adjacent its top. Various mechanisms were provided with radially extending teeth to mesh with the pins and drive them correlative to the movement of the conveyor. To provide versatility of the machine, it was found desirable to provide the receivers with openings of various sizes and shapes so that containers of various sizes and shapes could be utilized in the packaging machine. This raised the problem of providing a structure in which the receivers could be readily interchanged and still maintain the correlative movement of the various mechanisms with the conveyor.

SUMMARY

The present invention relates generally to conveyors and more particularly to a conveyor with interchangeable receivers.

A general object of the present invention is to provide a new and useful conveyor in which the receivers may be readily removed and interchanged with other receivers.

Still another object of this invention is to provide a conveyor in accordance with the foregoing object and in which various mechanisms have their operations coordinated with the conveyor movement.

These, and other objects and advantages of the present invention, will become apparent as the same becomes better understood from the following detailed description when taken in conjunction with the accompanying drawings.

DRAWINGS

FIG. 1 is a perspective view of a portion of a machine incorporating the present invention;

FIG. 2 is a perspective view of a portion of the conveyor with some of the receivers removed;

FIG. 3 is a cross-sectional view, on a larger scale, taken generally along line 3–3 of FIG. 2;

FIG. 4 is a longitudinal sectional view of the outlet terminus portion of the machine shown in FIG. 1;

FIG. 5 is a top view of the conveyor and having portions broken away for better illustration;

FIG. 6 is a longitudinal sectional view taken along line 6–6 of FIG. 5;

FIG. 7 is a partial perspective view of a corner of a typical receiver and illustrating the recess for supporting the receiver;

FIG. 8 is an exploded view of a latch assembly preparatory to mounting on a receiver; and FIG. 9 is a perspective view illustrating one alternate receiver which may be utilized in the conveyor of the present invention.

DESCRIPTION

Reference is now made more particularly to the drawings which illustrate the best presently known mode of carrying out the invention and wherein similar reference characters indicate the same parts throughout the several views.

The apparatus shown in FIG. 1 includes an endless conveyor, generally designated 20, for advancing a number of containers past a product dispenser or filler 24, a sealer 26, and a cutter 28 to the outlet end of the machine. A typical package (not shown) has an outwardly extending peripheral flange and, after being filled with a product, has a cover sealed to the peripheral flange by the sealing means 26. The covers are advantageously formed from a thin web 37 of material continuously fed from a supply roll 38 in any convenient manner. The packages are separated by cutting the web of material in an area between the adjacent containers as by the cutter 28. The general structure of the machine conveniently includes channel-shaped side panels 41, 42 supported on legs 44, 46. A pair of rails 48, 48' are supported on the upper flange of the channel-shaped sidewalls 41, 42, respectively, for a purpose hereafter explained.

The conveyor 20 includes a plurality of pivotally interconnected frames each of which holds an interchangeable receiver, generally designated R. The pivotally interconnected frames include a plurality of longitudinally extending side members 51 adjacent the front of the machine, and side members 52 adjacent the rear side of the machine. Side members 51 and 52 are arranged with their ends in overlapping relationship and are pivotally interconnected by means of laterally extending members 54 which pass through the side members. As can be seen, the lapping is arranged so that the opposite side members 51 and 52 are always approximately equal distances from each other. Rollers 59 are mounted adjacent the extremities of the lateral members 54 to engage the rails 48, 48' to support the upper flight of the endless conveyor. Rollers 54 at the back side of the conveyor are also engaged by a driven star wheel 62, as best seen in FIG. 4. A second identical star wheel (not shown) is mounted to engage the rollers at the opposite side of the conveyor. The star wheels are mounted on a driven shaft 66 which is driven by motor M as through a variable speed drive 68. Star wheels of similar construction to that of star wheel 62 are mounted adjacent the inlet end of the machine and define the inlet terminus of the endless conveyor. The inlet star wheels rotate as the conveyor 20 is driven, or they too may be driven if desired. Reference is made to the aforementioned parent patent application for a more complete description of the manner in which the conveyor is driven.

In the embodiment illustrated, the containers are discharged onto an inclined ramp 117 (see FIGS. 1 and 4) at the outlet end of the machine. The ramp is disposed closely adjacent the outlet terminus of conveyor 20 and supported by arms 119. To assure discharge of the containers, an ejector 115 is mounted to extend over shaft 66 and positioned so that its outer extremity extends into the receivers R through the open bottom thereof.

Adjacent the top of side members 52 are a plurality of generally equally spaced rack teeth shown in the form of laterally extending pins 70. It is deemed obvious that these pins are advanced with the conveyor and, as best shown in FIG. 1, a sprocket may be engaged by the pins to drive the filler 24, sealing means 26, and/or cutting means 28. This arrangement provides a positive relationship between the conveyor and the driven apparatus since the pins or teeth 70 are positively located on each side member 52 to provide a generally continuous rack which does not become elongated from wear as in a chain and sprocket arrangement. Other advantages of this arrangement, and further description thereof, is given in the above-mentioned parent patent application which is incorporated herein by reference. It can be seen that whatever mechanism is engaged with the rack teeth 70, it is driven thereby in timed sequence with the movement of the endless conveyor 20.

As previously indicated, the receivers R are shaped for receiving the containers. As best illustrated in FIG. 2, one receiver embodiment is shaped for receiving a generally rectangular container and for supporting the outwardly extending flanges of the container on its upper surface 74. The upper surface 74 preferably comprises a layer of resilient and heat insulating material to aid in the sealing operation. The receivers may have tapered inner sidewalls 76 and a generally open bottom, if desired.

The interchangeable receivers R are supported on the pivotally interconnected frames. As can be seen, the receivers R are sized to be disposed between the side members 51 and 52, but are supported upon the laterally extending members 54. For this purpose, the lateral extending edges are recessed as at 101 to engage the members 54. Recess 101 may be enlarged as at 102 to dispose the central portion away from the members 54, if desired. In this manner, only the four corners of the receiver are engaged and supported upon the members 54. The interchangeable receivers R are supported in position in a manner hereinafter explained. The receivers are arranged so that the individual frames can pivot about members 54 without interference from the receivers R. Additionally, the receivers R are slightly spaced from each other to allow the aforementioned cutting operation.

Preferably the receivers R are readily removable from the frame of the conveyor 20 for replacement or interchanging with other shaped or sized receivers. For this purpose, side members 51 and 52 are provided with centrally located openings 82. Each receiver R, in the embodiment illustrated, is provided with a fixed laterally extending pin 84 at one side for fitting into one of the openings 82. At the opposite side of the receiver R is a latch assembly, generally designated 86 and best shown in FIG. 8. To accommodate this assembly, the sidewall 76 is provided with a recess 87 which has an inner shoulder 88 and an opening through the shoulder 89. Referring to FIG. 8, the assembly 86 includes a generally cylindrical pin 94 having a fixed outwardly extending shoulder 95 intermediate its ends. A washer 96 is arranged to receive the outer end of the pin 94 and is designed to have a press fit into the recess 87 and be fixed with respect thereto. A spring 97 is disposed around the inner portion of the pin 94 and lies between the shoulder 95 of the pin and the shoulder 88 of the recess. A spring 97 resiliently urges the pin 94 to an extended position disposed in an opening 82. It can be seen that the pin 94 can be readily moved inwardly to a release position out of engagement with the opening 82 thereby allowing the receiver R to be easily removed from the frame. Pins 84 and 94 are preferably located so that they engage the top of openings 82 and hold the receiver R with its recesses 101 engaged with laterally extending members 54.

Referring to FIG. 9, there is shown a receiver R' which is exemplary of a differently shaped receiver which is interchangeable with the receiver R. In this embodiment, two openings 110 are provided to receive two separate packages for each receiver. Other than the size and shape of the openings, all other portions of the receiver are identical in function to that described above for receiver R and similar parts are designated by the same numerals followed by the postscript prime ('). It can be seen that the present invention is not limited to the particular size nor shape of the receivers which may be interchanged with each other and that receivers having different numbers of pockets for supporting the containers may be provided.

It is now deemed obvious that the present invention provides a conveyor with interchangeable receivers in which the receivers are supported on pivotally interconnected frames and which are readily removable and interchanged with other receivers. In addition, it can be seen that the conveyor provides an apparatus in which a mechanism is driven thereby in timed sequence with the movement of the conveyor. The embodiments of the invention in which an exclusive property or privilege is claimed are defined as follows:

I claim:

1. In a machine for advancing containers along a longitudinal path, the combination of: a longitudinally extending endless conveyor having inlet and outlet termini and including a plurality of sets of laterally spaced side members arranged with ends in juxtaposition, a plurality of receivers shaped for receiving at least one container and each shorter than the side members and disposed between the side members, means removably mounting the receivers on the side members so that other receivers may be interchanged therewith, pivotal interconnecting means at each juxtaposed end of the side members, the pivotal interconnecting means being continuous between the side members and having a lateral portion extending laterally beyond each side member, the receivers having means for engaging the pivotal interconnecting means to support the receivers thereon, first and second means at the respective inlet and outlet termini and adjacent the side members for engaging the lateral portions and entraining the conveyor over the first and second means, means for driving one of the first and second means to advance the conveyor, a plurality of generally equally spaced rack teeth rigid with the side members at one lateral side, and a mechanism engaged with the spaced rack teeth and driven thereby in timed sequence with the movement of the conveyor.

2. The combination of claim 1 wherein each side member has an opening therein intermediate its ends, and wherein the means removably mounting the receivers includes a stud at each lateral side of each receiver and arranged to fit into a side member opening, the stud at one receiver side being resiliently urged to a latch position disposed in the side member opening and movable to a release position removed from the opening for removal of the receiver.

3. In a machine for advancing containers along a longitudinal path, the combination of: a longitudinally extending endless conveyor having inlet and outlet termini and including a plurality of sets of laterally spaced side members arranged with ends in juxtaposition, a plurality of receivers shaped for receiving at least one container and each disposed between the side members, means removably mounting the receivers on the side members so that other receivers may be interchanged therewith and including a stud on one of the group including a side member and a receiver, the other of the group having an opening for receiving the stud in a latch position, means resiliently urging the stud to its latch position, the stud being movable against the resiliently urging means to a release position out of engagement with the opening for removal of the receiver, pivotal interconnecting means at each juxtaposed end of the side members and having a lateral portion extending laterally beyond each side member, first and second means at the respective inlet and outlet termini and adjacent the side members for engaging the lateral portions and entraining the conveyor over the first and second means, means for driving one of the first and second means to advance the conveyor, a plurality of generally equally spaced rack teeth rigid with the side members at one lateral side, and a mechanism engaged with the spaced rack teeth and driven thereby in timed sequence with the movement of the conveyor.

4. A conveyor with interchangeable receivers of the type having means for advancing the receivers in an endless manner, the conveyor including: a plurality of side members at each lateral side of the conveyor and arranged with their ends in juxtaposition a plurality of laterally extending members extending between the lateral sides of the conveyor and each pivotally interconnecting a pair of side members at each side of the conveyor, the side members and the laterally extending members defining a series of pivotally interconnected frames arranged for movement in an endless manner, a receiver shaped for receiving at least one container disposed in each frame and having its longitudinal ends supported on two successive laterally extending members whereby each laterally extending member supports the longitudinal ends of two adjacent receivers, and means for releaseably attaching each receiver to the opposite side members so that the receiver is held in position supported on the laterally extending members and is readily released so that other receivers may be interchanged therewith.

5. A conveyor with interchangeable receivers as set forth in claim 4 wherein the last-mentioned means includes a stud on one of the groups including a side member and a receiver, the other of the group having an opening for receiving the stud in a latch position, means for resiliently urging the stud to its latch position, and the stud movable against the resiliently urging means to a release position out of engagement with the opening for removal of the receiver.

6. A conveyor with interchangeable receivers as set forth in claim 4 wherein the side members are longer than the spacing of the laterally extending members and are alternately offset so that their ends are in overlying relationship, the side members of each frame being offset in the same direction to provide a generally uniform distance between the side members, each laterally extending members comprises a shaft extending through the overlying portions of the side members to pivotally interconnect the same, and each receiver having a recess at the bottom of each longitudinal side thereof for bearing against the shaft to support the receiver.

7. A conveyor with interchangeable receivers as set forth in claim 6 wherein each side member has a centrally located opening therein, and wherein the means for releasably attaching each receiver includes a stud at each lateral side of each receiver and arranged to fit into a side member opening, the stud at one receiver side being resiliently urged to a latch position disposed in the side member opening and movable to a release position removed therefrom for removal of the receiver.